Figures 1, 2, 3:
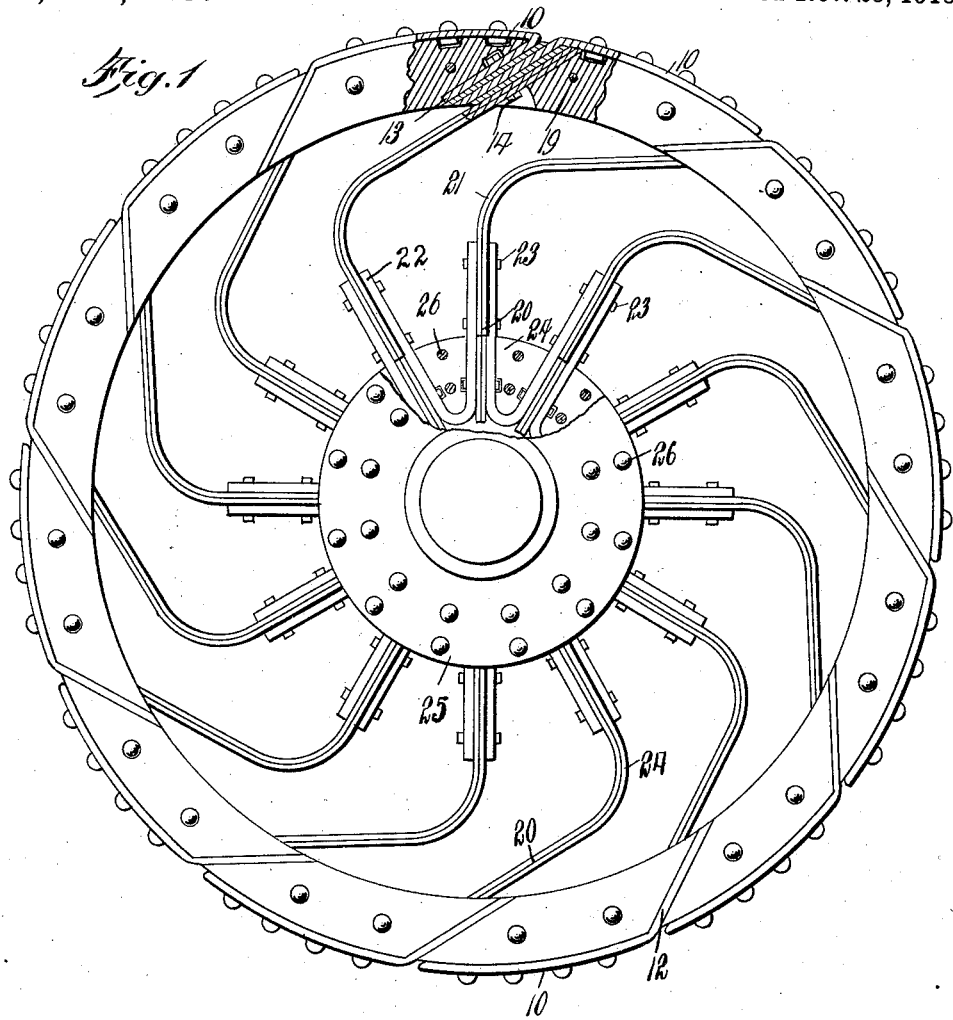

J. D. COLLIER.
SPRING WHEEL.
APPLICATION FILED OCT. 11, 1912.

1,079,840.

Patented Nov. 25, 1913.

WITNESSES
F. D. Sweet
B. Joffe

INVENTOR
James D. Collier
BY
ATTORNEYS

UNITED STATES PATENT OFFICE.

JAMES DELL COLLIER, OF REDLANDS, CALIFORNIA.

SPRING-WHEEL.

1,079,840.  Specification of Letters Patent.  Patented Nov. 25, 1913.

Application filed October 11, 1912. Serial No. 725,227.

*To all whom it may concern:*

Be it known that I, JAMES D. COLLIER, a citizen of the United States, and a resident of Redlands, in the county of San Bernardino and State of California, have invented a new and Improved Spring-Wheel, of which the following is a full, clear, and exact description.

This invention relates to improvements in vehicle wheels, and has reference more particularly to that class of spring wheel which comprises a plurality of shoes and resilient spokes so associated with the hub as to form a vehicle spring wheel.

An object of the invention is to provide an inexpensive, simple, solid and flexible spring wheel which will make the traction more elastic and give sufficient radial resiliency to the vehicle carried by the wheel.

Another object of the invention is to provide a spring wheel which will prevent any lateral displacement of the felly relatively to the hub.

A further object of the invention is to provide a spring wheel in which the outer shoe is formed in sections so that if one part of the shoe is worn out only that particular part could be replaced in the new shoe.

Reference is to be had to the accompanying drawings forming a part of this specification, in which like characters of reference indicate corresponding parts in all the views, and in which—

Figure 1 is an elevation of an embodiment of my invention, with a face plate and shoes partly in section; Fig. 2 is a vertical section through the shoes; while Fig. 3 is a section on the line 3—3 of Fig. 2.

Referring to the drawings, 10 is a tread of the shoe and is preferably provided with protuberances 11 formed on the surface contacting with the ground, integrally with it or simply by inserting rivets as shown in the drawings. The end portions 12—13 of the tread 10 are bent in a proper angle so as to correspond with the angle formed by the spokes, as will appear hereinafter. Orifices are also provided in said bent portions near the ends of same, and are adapted to receive bolts 14. Fitting in the tread between said bent portions 12—13, and against the inner surface of the ground bearing surface and the bent portion 13 of the tread 10, is a wooden block 15, said block near the bent portion 12 leaving enough space to admit between the inner side of the bent portion and itself the side members 16 of the shoe and the spring spokes. The wooden block 15 is cleared in the spaces where the bolt heads project into it. The side members 16 of the shoe inclosing the wooden block 15, the bent portion 13 of the tread 10, and the spring spokes, may be considered as one right and the other left. The side members 16 abut one against the other at the central circumferential line of the wheel by means of portions 17—17, 18—18 bent to the same angle as the bent portions 12—13 of the tread 10, and respectively in contact with same and with the spring spokes. Bolts 19 bind two side members and the wooden block, while the bolts 14 bind the tread 10 and the side members of one shoe, the side members of the following shoe and the spring spokes 20 fitting in the shoe. It is understood that the side members and spring spokes being provided with orifices registering between them and with the orifices of the bent portions of the tread 10, as above mentioned.

The bent portion 12 and the ground contacting surface of the tread 10 are in width equal to the width of the wooden block and the two side members 16, so that the contacting surface of the tread 10 is supported by both the wooden block 15 and the edges of the side members 16, as best seen in Fig. 3. The bent portion 13 of the tread 10 is in width equal to the width of the wooden block 15, as it is inclosed by the portions 18 of the side members 16.

The spring spokes 20 are formed preferably by two similar flat springs having their outer end fixed in the shoe as above described, and consequently in their outer end making the same angle with the tangent of the contacting surface of the tread 10 as the bent portions of the tread itself. Near the middle, between the outer and inner extremities, the spring spokes form a curve 21 so that the inner pointing portion of the spoke is at right angles to the outer pointed portion. To increase the strength of the spokes above the curved part 21 a V-shaped member 22 is placed between each pair of spokes and attached to same by means of bolts 23. Wooden blocks 24 are placed in the lower part of the V-shaped member so as to give them more body, and side or face flanges 25 bind said V-shaped members 22 and wooden blocks by means of bolts 26, said flanges and blocks constituting the hub of the wheel.

The series of shoes interconnected by means of the bolts 14 form a continuous felly and tire so that the pressure is uniformly distributed to the body of the wheel by means of the spring spokes bent at right angles. I have found from experience that the spring ends bent at right angles to each other and forming the spoke give a far better traction wheel than any other spoke having a different angle. It is easily seen that if any part of the wheel is worn out it is not necessary to replace the tread on the entire wheel, but only of those shoes that have the tread worn out, and to remove the tread is a very simple matter, as by removing the bolts 14 and 19 the side members 16 may be removed, and then the tread with the wooden block is also removed; a new tread is placed on the wooden block and between the spring spokes so as to leave space for the side members 16 to be placed in position, and by replacing the bolts 19 and 14 the new tread is in position.

Having thus described my invention, what I claim as new and desire to secure by Letters Patent is:—

1. A device of the class described comprising a hub, resilient spokes associated with said hub at one end, V-shaped resilient members associated with said hub and interposed between each pair of said spokes to strengthen the same near the hub, the other end of said spokes being at right angles to the first end engaging the hub, an independent shoe for each of last said ends of said spokes, and means associated with said shoes for binding same together to form a continuous ring.

2. A device of the class described comprising a hub, resilient spokes associated with said hub, an independent shoe for each of said spokes, said shoes being formed by side members, a block inclosed in said side members, and a removable tread associated with said side members and said spokes.

3. A device of the class described comprising a hub, resilient spokes associated with said hub, an independent shoe for each of said spokes, said shoes formed by side members, a block inclosed in said members, and a removable tread having both ends bent to a predetermined angle with the surface contacting with the ground and associated with said side members, block and spokes, and means for binding them together.

4. A device of the class described comprising a hub, resilient spokes associated with said hub, an independent shoe for each of said spokes, said shoes formed by two side members having bent portions abutting against each other and making a predetermined angle with the curved surfaces of said side members, a block inclosed in said side members, and a removable tread associated with said side members, block and spokes, and means for binding them together.

In testimony whereof I have signed my name to this specification in the presence of two subscribing witnesses.

JAMES DELL COLLIER.

Witnesses:
W. H. JOHNSON,
JOHN W. COLHOP.

Copies of this patent may be obtained for five cents each, by addressing the "Commissioner of Patents, Washington, D. C."